May 28, 1968
G. T. SORENSON
3,385,080
FLEXIBLE SHAFT COUPLING
Filed April 5, 1966
2 Sheets-Sheet 1
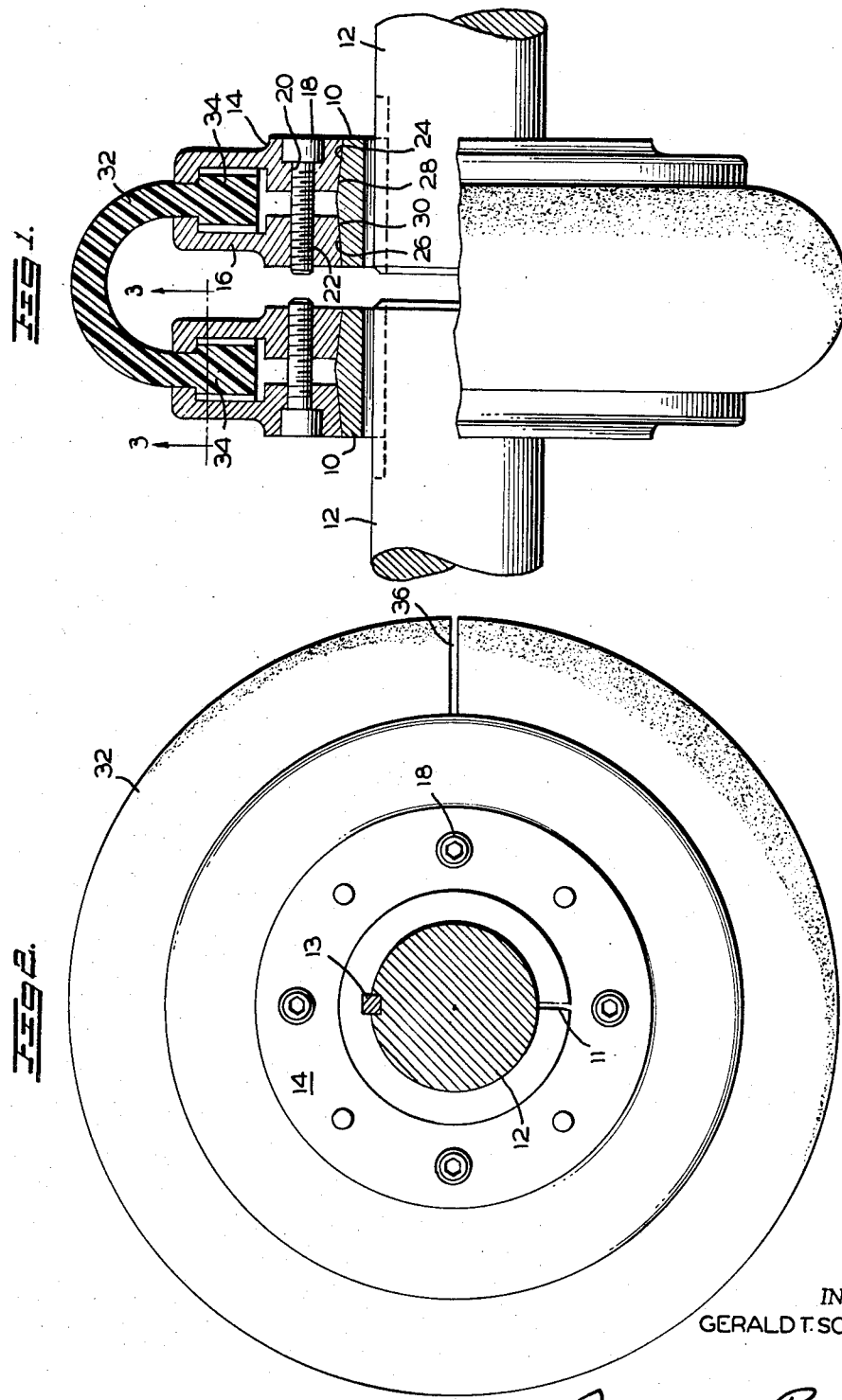
INVENTOR
GERALD T. SORENSON
BY
ATTORNEYS

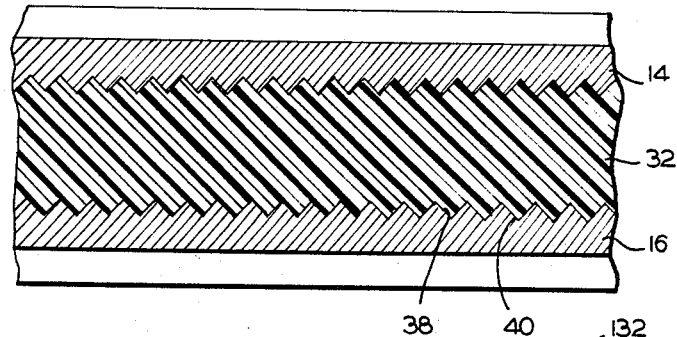
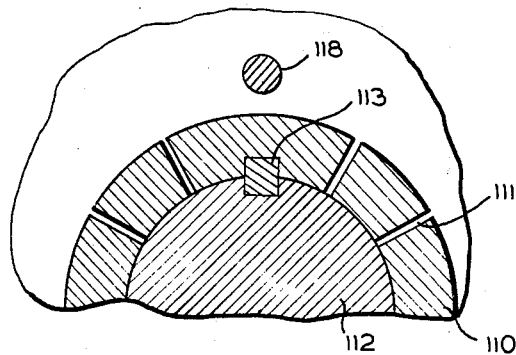
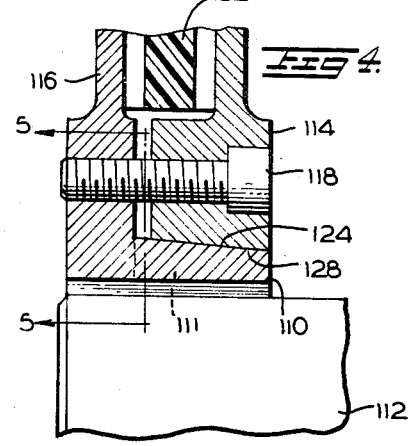
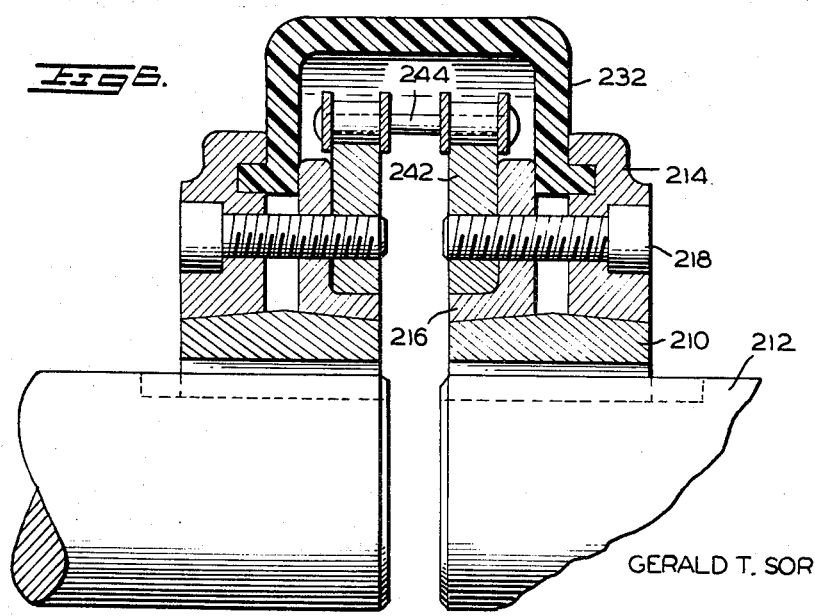

United States Patent Office 3,385,080
Patented May 28, 1968

3,385,080
FLEXIBLE SHAFT COUPLING
Gerald T. Sorenson, 910 Elm Grove Road,
Elm Grove, Wis. 53122
Filed Apr. 5, 1966, Ser. No. 540,244
6 Claims. (Cl. 64—11)

This invention relates generally to couplings for rotating shafts and the like and more particularly to a coupling which provides a flexible joint between axially aligned rigid shaft ends.

Prior art couplings, of the type to which this invention relates, in general, require special fittings on the end of the shafts to provide the necessary attachment for elements flexible connecting the shafts. This requirement greatly increases the cost and expense of installing flexible couplings in pre-existing or stock shaft systems. Another coupling of the type to which this invention relates overcomes this problem to some degree by providing an adaptor or collar in which the ends of axially aligned shafts are gripped, while at the same time, gripping a flexible element extending between the ends of the shaft. A device of this latter type is disclosed in United States Patent No. 3,020,737 to David Firth. This device incorporates a split, tapered bushing on the end of each shaft with a split hub, having an internal surface tapered to correspond with the taper of the bushing, surrounding the bushing. An annular rigid ring surrounds the hub in spaced relation thereto and a flexible shaft connecting member is disposed in this space so that, upon relative wedging movement between the bushing and the hub, the flexible member is gripped therebetween and, at the same time, a gripping action is exerted between the bushing and the shaft.

In one version of the above device, the rigid ring is formed so that, after a certain amount of expansion of the hub due to the wedging action, the hub and ring positively engage one another thereby limiting the gripping action between the hub and ring on the flexible element and preventing further adjustment to increase the gripping action if required by wear or other actions on the device during use.

Another version of the above device avoids the above-stated problem by utilizing a ring which is configured to avoid positive engagement betwen the hub and ring regardless of the amonut of expansion of the hub due to the wedging action. Although this version will allow adjustable gripping action on the flexible member, the flexible member is included in the "train" of elements exerting a gripping force on the shaft through the bushing thereby limiting that gripping action to a value determined by the resistance to compression of the flexible member since there is no positive contact between the split bushing, hub and rigid ring elements. As the resistance to compression of the flexible element decreases due to time and/or use, the gripping action between the bushing and shaft will also tend to decrease thereby requiring continual readjustment of the coupling to prevent slippage between the elements.

It is one of the objects of this invention to provide a flexible coupling for axially aligned shafts which avoids the above-described problems by furnishing means to positively grip the shaft to which the coupling is attached while furnishing means to simultaneously but adjustably grip the flexible element thereof.

It is another object of this invention to provide a flexible coupling device for axially aligned shafts or the like which can readily be installed on existing or stock shafts without modification thereto.

It is another object of this invention to proivde a flexible coupling device for axially aligned shafts in which the flexible element of the coupling system and the shaft to which the device is connected are simultaneously gripped thereby with any force required.

It is a further object of this invention to provide a flexible coupling device for axially aligned shafts which incorporates gripping means which may be readily adjusted any time during the life of the coupling to increase the gripping action thereof while at the same time maintaining a positive grip on the shaft to which it is mounted.

These and other objects of the invention will be more readily understood by reference to the following detailed description when viewed in light of the accompanying drawings wherein like portions thereof are indicated by like numerals throughout the figures thereof and wherein:

FIGURE 1 is a sectional view in elevation of a coupling in accordance with the invention;

FIGURE 2 is a 90° plan view of the coupling of FIGURE 1;

FIGURE 3 is an enlarged fragmentary section, partly broken away, of the coupling of FIGURE 1 taken along the line 3—3 thereof;

FIGURE 4 is an enlarged elevational view in section and partly broken away of a modified form of a coupling in accordance with the invention;

FIGURE 5 is a fragmentary sectional view of the coupling of FIGURE 4 and taken along the lines 5—5 thereof; and FIGURE 6 is an enlarged fragmentary elevational view of another modification of a coupling in accordance with the invention.

Turning now to FIGURES 1 and 2, the coupling shown therein comprises a pair of bushings 10, each mounted on the end of shafts 12. Since the mounting structure is identical for each shaft, reference will be made, where appropriate, to only one of the shaft mounting structures described hereinafter with the understanding that the description is applicable to either. The bushing 10 is split with a discontinuity at 11 to provide for compression thereof and gripping of the shaft 12 as will be described in greater detail below. It should be obvious that, depending on the end use of the device, the bushing may be continuous if suitable. A key 13, fitting into matching key ways in the bushing 10 and shaft 12 may be provided to provide additional connection between the elements if needed again as dictated by the use to which the device is to be put. The shaft and bushing could also be suitable splined if desired. In this event, it is preferable that the bushing 10 be continuous and not split since the splines would allow the bushing to deform and conform to the shaft spline with a suitable fit. The bushing 10 is surrounded by an annular structure comprising a pair of longitudinally spaced, radially extending components 14 and 16. A plurality of bolts 18 extend through smooth counter sunk bores 20 in the component 14 into threaded bores 22 in the component 16 to provide adjustable connection therebetween. The bushing 10 is provided with a pair of axially extending, oppositely tapered external surfaces 24 and 26 which slope outwardly from each end of the bushing. The components 14 and 16 are similarly provided with tapered internal surfaces 28 and 30 which are angled to correspond to the external tapered surfaces of the bushing 10.

With reference to the threaded bolts 18, although four bolts are shown connecting the components 14 and 16 in the drawings, any suitable number of bolts may obviously be utilized to accomplish the purposes of connection.

An annular flexible member 32, having a pair of transverse inwardly extending edges with axially projecting enlarged portions 34 thereon, is disposed between the ends of the shafts 12 with the enlarged portions extending into the space between components 14 and 16 of the hub structure of each of the shafts. Reinforcing loops of strands of fabric or wire may be embedded in the flexible member 32, preferably within the enlarged portions 34, of the use to which the coupling is to be put so dictates. The flexible member 32 is split at 36 (FIGURE 2) to facilitate installation and/or replacement of the member around the component 16. The flexible member 32 may, of course, be formed as a continuous annulus without a split if the member 32 is of sufficient flexibility to allow the components 16 to be inserted therein.

Referring now to FIGURE 3 of the drawings, enlarged detail of the connection between the components 14 and 16 of the flexible member 32 is shown in detail. The interior transverse surfaces of the components 14 and 16 are provided with a plurality of radially extending teeth 38 which engage similar teeth 40 formed in the exterior transverse surfaces of the flexible member 32 to provide an interlocking retention of the member 32 between the components. Obviously, other similar frictional increasing structure such, for example, as knurled or roughened surfaces can be furnished at the interface between these components for this purpose. It should also be noted that the enlarged portions 34 of the flexible member 32 are configured so that they extend beneath axially projecting peripheral portions of the components 14 and 16 so that any force tending to withdraw the flexible member 32 from between the components can be effectively resisted.

It is anticipated that the components 14 and 16 can be die cast in smaller sizes, shall molded or can be deep drawn from flat stock. If a deep drawn component is utilized, the cross section thereof can be such that the flexible member 32 can be positioned therebetween with a resilient clamping action by causing elastic deflection of the components 14 and 16 when installing the device. This spring force will overcome any tendency of the grip between the components 14 and 16 and the flexible member 32 to loosen due to changes in the resiliency of the flexible member 32 over a period of time and/or use.

In installation, the components 14 and 16, with the portions 34 of the flexible member 32 disposed therebetween may be first loosely assembled over the bushing 10. The bolts 18 are then loosely threaded through the smooth bores 20 in the component 14 into the set of bores 22 in the component 16 and the assembly is disposed over the ends of the shaft 12. When the assembly is properly positioned, the bolts 18 are tightened down thereby drawing the components 14 and 16 towards one another to provide a clamping and/or locking action on the flexible member 32 and, simultaneously, a compressing action on the bushing 10 through interaction between the tapered surfaces 24–28 and 26–30. The tightening of the bolts 18 may be continued until the required clamping force is exerted between the bushing 10 and the shaft 12 and/or between the components 14 and 16 and the flexible element 32. A positive clamping action between the bushing 10 and 12 is thereby provided simultaneously with a separate clamping action between the components 14 and 16 and the flexible element 34, which clamping action may be adjusted as time and use dictate. The toothed interfitting, between the flexible element 32 and the components 14 and 16, loads both of the transverse sides of the flexible member in shear resulting in a balanced stress condition and thereby allowing the greater torque to be transmitted with any given size flexible member. The device accomplishes a simultaneous compression fit of the bushing 10 with the shaft 12 as well as the locking, gripping and/or positioning of the flexible element or member between the components. The above-described assembly of the device can also be accomplished by first disposing the component 14 around the bushing 10, disposing the bushing 10 over the end of the shaft 12 and then assembling the remaining components in suit if so desired.

Turning now to FIGURES 4 and 5 of the drawings, another version of a coupling embodying features in accordance with this invention is shown in enlarged detail. Elements of this coupling corresponding to similar elements of the aforedescribed coupling are indicated by like numerals, only of the next higher order. The primary distinction between the coupling of FIGURES 1 through 3 and the coupling of FIGURES 4 and 5 is in the provision of a single tapered surface 124 in the bushing 110 as opposed to the double tapered surface of the previously described coupling. The bushing 110 is provided with a transversely extending flange 116 formed thereon proximate one end thereon. The single tapering surface 124 meets with a similar tapering surface on the component 114 which serves essentially the same function as the tapering surfaces of the aforedescribed coupling. By reference to FIGURE 5, it can be seen that the bushing 110 is provided with a plurality of longitudinally extending splits 111 which extend from a point proximate the juncture of the bushing with the flange 116 to the minor diameter end thereof to provide the required compressive capability for the bushing.

The installation of the bushing of FIGURES 4 and 5 is identical to that described for the embodiments of FIGURES 1 through 3 and the interaction between the components during tightening of the bolts 118 occurs in somewhat a similar fashion. During tightening of the bolts 118, with the assembly suitably positioned over the end of the shaft 112, the flexible element 132 is compressed between the flange 116 and the component 114 as the component is moved toward the flange. Simultaneously, the interaction between the tapering surfaces 124 and 128 causes compression of the bushing 110 with an attendant gripping of the shaft 112 thereby. Again, as was described for the aforegoing figures, the splits or discontinuities 111 in the bushing 110 may be omitted, if the use to which the coupling is to be put so dictates.

Referring now to FIGURE 6 of the drawings, still another variation of a coupling in accordance with this invention is shown. Again in this variation, elements corresponding to similar elements of the aforedescribed couplings are indicated by like numerals only of the next higher order. The essential distinction between the embodiment shown in FIGURE 6 and those of the preceding figures is in the provision of a more positive additional link between the shafts 212. This additional link comprises a pair of sprockets 242 mounted on the component 216 and connected thereto by means of the bolt 218 threaded through a threaded bore therein. The sprockets are drivingly interconnected by annular roller chain 244 bridging the teeth in the sprockets 242. Obviously the sprockets 242 can be formed integral with the component 216 if so desired.

Installation of the coupling shown in FIGURE 6 is essentially the same as that described for the preceding figures, with the sprockets 242 being engaged by the bolt 218 to be positioned and locked into place on the component 216 as the components 214 and 216 are drawn together. Clamping action on the shaft 212 and the member 232 occurs in a manner identical for the embodiment of FIGURES 1 through 3. The member 232, in the embodiment of FIGURE 6, serves as a cover to guard the roller chain and sprocket connection as well as a lubricant retainer for the lubrication necessary in couplings of this type.

What has been set forth above is intended primarily as exemplary of teachings in accordance with this invention to enable those skilled in the art in the practice thereof. It should, therefore, be understood, that within the scope of the appended claims, the invention may be practiced other than as specifically described.

What is new and, therefore, desired to be protected by Letters Patent of the United States is:

1. A coupling for connecting two shafts in end-to-end relationship comprising:

a bushing of the mutually adjacent end of each of said shafts, each of said bushings having at least one tapered external surface thereto;

an annular structure surrounding each of said bushings, said structure including a pair of longitudinally spaced radially extending components, at least one of said components having an internal surface tapered to correspond with the tapered external surface of said bushing for abutting contact therewith;

a flexible annular drive means between said annular structures having a pair of transverse inwardly extending edges thereto, axially projecting enlarged portions on each edge of said member extending into the space between the components of the respective annular structures; and means between the components of said annular structure to provide movement of at least one of the components toward the other for contracting said bushing about said shaft and clamping of the enlarged portion of said flexible means therebetween.

2. A coupling in accordance with claim 1 wherein said bushing has two axially extending oppositely tapered surfaces sloping outwardly from each end thereof, and wherein each of the components of said structure has an internal surface tapered to correspond to one of the oppositely tapered surfaces of said bushing.

3. A coupling in accordance with claim 1 wherein said bushing has one tapered surface extending axially from one end to a point intermediate the ends of said bushing, and wherein one of the components of said structure has an internal surface tapered to correspond with the external surface of said bushing and the other of the components of said structure is fixed to said bushing at a point other than the tapered surface thereof.

4. A coupling in accordance with claim 1 wherein said bushing comprises a discontinuous annulus having a substantially longitudinally disposed radial split therethrough.

5. A coupling in accordance with claim 1 wherein the transverse surfaces of said axially projecting enlarged portion are provided with radially extending teeth therein and wherein said components are provided with radially extending teeth along the transverse surface thereof abutting said enlarged portion to interlock with the teeth of said portion.

6. A coupling in accordance with claim 1 wherein an annular sprocket means is mounted on the said annular structure surrounding each of said bushings and a roller chain is in surrounding engagement with said sprocket means.

References Cited

UNITED STATES PATENTS

| | | | |
|---|---|---|---|
| 2,587,365 | 2/1952 | Mize | 64—19 |
| 2,787,483 | 4/1957 | Harvey et al. | 287—52.06 |
| 3,178,906 | 4/1965 | Ricketts | 64—11 |
| 3,232,076 | 2/1966 | Sundt | 64—11 |
| 3,233,427 | 2/1966 | Firth | 64—11 |

FOREIGN PATENTS 632,967　12/1961　Canada.

HALL C. COE, *Primary Examiner.*